United States Patent [19]

Hill

[11] Patent Number: 5,274,806
[45] Date of Patent: Dec. 28, 1993

[54] HIERARCHICAL DATA ENCYCLOPEDIA

[75] Inventor: Thomas L. Hill, Dallas, Tex.

[73] Assignee: Electronic Data Systems Corporation, Dallas, Tex.

[21] Appl. No.: 956,477

[22] Filed: Oct. 2, 1992

Related U.S. Application Data

[63] Continuation of Ser. No. 517,829, May 2, 1990, abandoned.

[51] Int. Cl.$^5$ .............................................. G06F 15/40
[52] U.S. Cl. ............................ 395/600; 364/DIG. 1; 364/283.2
[58] Field of Search ............. 364/DIG.; 395/600, 200

[56] References Cited

U.S. PATENT DOCUMENTS

| | | | |
|---|---|---|---|
| 4,536,840 | 8/1985 | Borta | 364/200 |
| 4,635,208 | 1/1987 | Coleby et al. | 364/491 |
| 4,688,195 | 8/1987 | Thompson et al. | 364/200 |
| 4,714,995 | 12/1987 | Materna et al. | 364/200 |
| 4,774,661 | 9/1988 | Kumpati | 364/DIG. 2 |
| 5,179,701 | 1/1993 | Chisholm | 364/DIG. 1 |

Primary Examiner—Thomas M. Heckler
Attorney, Agent, or Firm—L. Joy Griebenow

[57] ABSTRACT

A computer performed method for designing a system which allows multiple mainframe environments to be supported and managed within the overall system environment through the use of (1) one or more dictionary domains arranged in a hierarchy to model the mainframe environments and a target system release facility to move a process, system, subsystem or record and all its related records to another dictionary domain, and (2) a consolidated project data encyclopedia which is shared by all users and divided into 5 logical data bases and 1 access module, thus allowing access to projects in different stages of development on the same physical data bases. A migration facility allows the user to manage the orderly progression of entities through the development life cycle by moving entities between logical data bases.

6 Claims, 1 Drawing Sheet

Microfiche Appendix Included
(11 Microfiche, 657 Pages)

HIERARCHICAL DATA ENCYCLOPEDIA

This is a file wrapper continuation of application Ser. No. 07/517,829, filed 05/02/90, abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention applies in the field of computer Aided System Engineering (CASE).

It should be noted that the specification is supplemented by a complete program listing of the corresponding specific program listing of the code) in a Microfiche Appendix containing eleven (11) microfiche pages.

BACKGROUND OF THE INVENTION

During the life cycle of a computer system, multiple software environments must be maintained on the computer system or on a test system in order to support the various activities needed to maintain and enhance the computer system. A development environment is used to code and unit test both software fixes and software enhancements. In this development environment there is very little control placed upon the permissible software changes; therefore, the system engineer (SE) is free to make software changes at will. After the software changes have been made and unit tested, the programs, maps, dsects, etc. are moved into the system test (model office) or staging environment that is maintained on the computer system. This staging environment is normally used as both a formalized system or release testing environment as well as a staging environment for the production system software. This staging environment is normally strictly controlled with few, if any, direct changes allowed. The fix environment is used to support changes to the production system software which are a result of abends or fixes to other computer system malfunctions. The required software changes are usually made and unit tested in the development environment and then moved to the fix environment. Finally, the production system software is used to contain the customer's functioning computer system (except for fixes). This is the most stable and highly controlled environment where changes are implemented only through the fix environment or planned movement of software from the staging environment.

These four environments (development, staging, fix, production) are normally viewed as a multi-level hierarchy where each level of the hierarchy contains only the software changes applicable to that environment. Under this configuration, a user of an environment would see only those software entities which are in the current environment plus those which are in his hierarchical path. Furthermore, each level down the hierarchical path acts as a concatenation, where duplicate software entities in the hierarchical path behave as if they were replacements. Thus a user of the system test environment would see system test software concatenated to fix software which is in turn concatenated to production software.

The current software management methods in this field provide a single software environment which is used to support the entire life cycle and corresponding software versions of a computer system. Under this configuration there is a single logical data base per computer system and thus one mainframe target environment for each computer system. With these restrictions and the requirement to support multiple mainframe environments associated with development, system test and production of software, it is extremely difficult to control the activities needed to co-ordinate the movement of software changes and software enhancements to and through the multiple environments. This co-ordination requires both a restriction on when software changes can be made in the overall environment and also the selective mainframe movement of programs, maps and other software entities from a staging environment to the desired production software environment. Additionally, there is a possibility that work in-progress may prevent the timely fix of a malfunction since that work may have to be undone or implemented early in order to correct the problem.

SUMMARY OF THE INVENTION

Accordingly, the present invention provides a number of advantages over the prior art, including, but not limited to, a data base that includes (1) a hierarchical dictionary and (2) and an encyclopedia structure. Multiple mainframe software environments can be supported and managed with the present invention by providing a capability within the data base to mirror the mainframe multi-level hierarchical environment structure.

Within the encyclopedia, an arbitrary multi-layer hierarchy of domains (hierarchical dictionary) is established to control the changes to the encyclopedia. Each lower level domain inherits the contents of the higher level domains in the hierarchy of domains; however, changes made within a domain affect only that domain and its subordinates.

This dictionary leveling allows production data to be used in the development environment, without the possibility of corrupting the production data. It also facilitates the movement of target system descriptions from test to production status in a controlled and timely manner.

The unique encyclopedia construct employed by this invention allows any user or data processing entity to be related to one or more other data processing entities. Each data processing entity is assigned a unique key, then through a permutation of that key, relationships with other data processing entities can be created.

This new and unique computer software management method utilizes a consolidated project data encyclopedia which is shared by all project users. The project data encyclopedia can be divided into several logical data bases. A user defines which logical data base he wants to use while a set of inherent rules controls the usage of data across the logical view of the project data encyclopedia. This allows the user to access projects in different stages of development on the same physical data bases. Additionally, a migration facility allows the user to manage the orderly progression of entities through the development life cycle by moving entities between logical data bases.

BRIEF DESCRIPTION OF THE DRAWINGS

The invention, together with further objects and advantages thereof, can be best understood by reference

DETAILED DESCRIPTION OF THE PREFERRED EMBODIMENT

Figure 1:
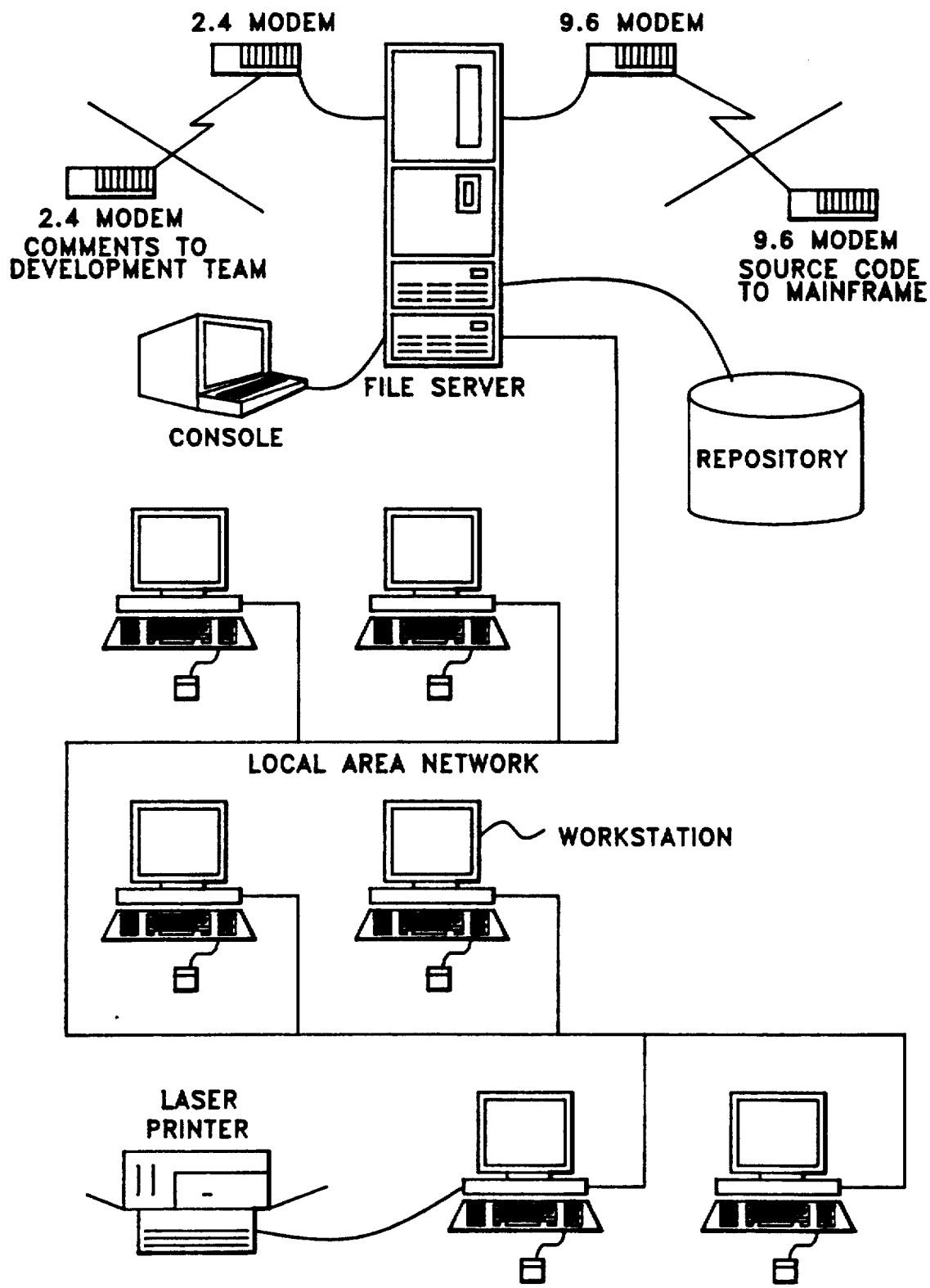

A preferred embodiment of the method of the present invention is implemented by utilizing a digital computer supported by a hardware platform with the following characteristics:

- High resolution display to support graphical modeling tools
- Windowing capabilities to allow concurrent access to multiple tools
- Multi-tasking operating system to support interprocess communication among various tools
- Local Are Network (LAN) for shared access to the repository and peripherals
- Object server capability to share analysis, design and construction objects across all workstations FIG. 1 illustrates a typical 6 workstation cluster hardware environment wherein systems engineers utilize Sun 3/60 workstations, a product of Sun Microsystems, Inc., Mountain View, Calif., containing a 32-bit, 68020 processor running at approximately 3MIPS. The workstation contains 8 megabytes of RAM, expandable to 24 megabytes. Each workstation is a diskless node that depends on the central file server for disk storage. The screens are monochrome and provide the 1152×900 pixel resolution and optical mouse support required for sophisticated diagramming. The multi-tasking requirement is satisfied by Berkeley Standard UNIX 3.4. Windowing support is provided by Sun's Sun View windowing environment; Sun View is a trademark of Sun Microsystems, Inc., Mountain View, Calif. Each workstation is linked to the file server and laser printer via a local area network (LAN).

The file server contains its own 68020 processor with 8 megabytes of RAM and two 892 megabyte disk drives. A standard dumb terminal is used as the system console. A built-in tape drive provides the backup facility. The file server is connected to the development group via a 2400 baud modem. Typically, mainframe access is provided through a 9600 baud modem. No special environment is required to house the file server.

I. OVERVIEW OF PREFERRED EMBODIMENT

The disclosure which follows describes the concatenated dictionary and target system release facility, and the structure of the encyclopedia data base and interface used by workstation applications to maintain the encyclopedia.

1. Concatenated Dictionary and Target System Release Facility

This invention allows multiple mainframe environments to be supported and managed within the overall environment enabling this encyclopedia data base to mirror the mainframe hierarchical environment structure. This capability entails the creation of multiple logical data bases within the current single physical data base structure of this invention. A new delineation of the current data base into dictionary domains allows the creation of multiple logical data dictionaries which are then arranged in a hierarchy to model the mainframe hierarchical environments. Along with the concatenated data dictionary, an orderly procedure for migrating data between the different dictionary domains enables a user in the overall environment to manage the corresponding mainframe hierarchical environments.

Concatenated Data Dictionary

The concatenated data dictionary is comprised of one or more dictionary domains arranged in a hierarchy. A dictionary domain is a logical group of data base records with the following characteristics:

- A dictionary domain determines the level and set of applicable data base records for a system sign-on combination
- Dictionary domains are arranged in hierarchies
- Synonyms are data base records with identical keys residing in different dictionary domains
- A dictionary inherits all data base records defined in the hierarchy above it
- The highest dictionary domain is a special dictionary domain which contains global information (i.e., event) base records should reside at the
- Data base records should reside at the highest applicable level
- Deleting a data base record in a dictionary domain disables further inheritance of that data base record
- Data base records at lower levels in the hierarchy replace their corresponding synonyms at that level and any lower levels in the hierarchical dictionary domain path.

Each computer system has a set of dictionary domains associated with it. At sign-on the user is allowed to select only those dictionary domains which are applicable to the computer system he is signing onto. Once signed onto a system/domain the user has access capability to all higher dictionary domains in the hierarchical dictionary domain path and update capability to data base records in the selected dictionary domain. To read a data base record which is applicable to a particular dictionary domain, the invention must search for the lowest level synonym in the domain hierarchy. An update, add, or deletion will always occur in the users current dictionary domain. Thus only the changes will reside in the current dictionary domain yet to the user it will appear as if he is working in an entirely separate data base.

Target System Release Facility

A target system facility is the ability to move a process, system, subsystem or record and all its related records to another dictionary domain. The target dictionary domain must be on the same or a higher level in the dictionary domain hierarchy. Once the designated items have been moved to the target dictionary domain, the code can be regenerated and recompiled into a different mainframe environment in the hierarchy of environments. This is accomplished by the concatenated dictionary's ability to have different data base system records in the various dictionary domains. Thus, in a typical maintenance environment with a domain hierarchy, a system engineer would work on software changes in the development domain until he is ready to implement the changes in the production software. At that time he would migrate the software under development into the system test domain and regenerate and recompile the software. This action would place the source and object files in the proper staging libraries for the move to production software. The final step would be migration of the revised software from the system test domain to the production domain in co-ordination with the mainframe moves.

The obvious advantage of the use of concatenated dictionaries and a target release facility is the ability to separate and manage the various mainframe environments from the local workstation. This entails the ability to migrate data base records between the various dictionary domains in the workstation environment and then compile the newly generated code into the proper mainframe environment. This is accomplished through the use of a different system record in each dictionary domain which directs the compiles to an appropriate procedure library.

Program/Structure/Data Base Changes:

A. Data Base Key Changes

The key structure of the physical data bases supports concatenated dictionaries. The key structure of these data bases is discussed in greater detail later, in the second half of this specification. On the instance, relate and text data bases the id0 of the applicable dictionary domain is appended to the current key. Thus, the key structure of these data bases looks as follows:

```
ushort r00x_inst_typ;
ulong r00x_id1;
ulong r00x_id2;
ulong r00x_id0;
ulong r00x_domain_id0;
```

The key to the xref data base likewise looks as follows:

```
char r003_xref_word;
ulong r003_domain-id0;
ushort r003_xref_qual;
ushort r003_tar_type;
ulong r003_tar_id1;
ulong r003_tar_id2;
ulong r003_tar_id0;
ulong r003_xref_id;
```

B. Domain Instance

An instance type must exist for the dictionary domains. The primary use of this instance type is to carry the id0 of the system which can use the dictionary domain and to allow the dictionary hierarchy to be created which relates data base records between the instances.

C. Event Instance

The event instance provides a place to store the domain hierarchy of the currently selected computer system and dictionary domain.

D. System Instance

In order to restrict the usage of dictionary domains, the system instance carries the id0's of the dictionary domains which can be used with the selected computer system. These system instances are only used by the sign-on process and are applicable only in the overall dictionary domain.

E. Overall Domain

There are some instance types which are global and need to be carried at the highest dictionary domain. The overall dictionary domain exists as the highest level in the dictionary domain hierarchy to hold the following instance types:
Systems Engineer
Workstation
Event Record
Domain
System All these instance types except the System would reside only in the overall dictionary domain. The System instance resides in the overall dictionary domain to carry the id0 of the applicable dictionary domains and it also resides in other dictionary domains to carry environment specific data.

F. Domain Hierarchy Construction

This tool builds the domain hierarchy in the overall dictionary domain. It maintains and enforces the rules for creating and updating the implemented with relate records in the overall dictionary domain.

G. Access

Access performs the following functions:
Read and recognize the domain hierarchy stored in the event record
Perform hierarchical reads find the lowest level synonym in the domain hierarchy
Perform physical adds and updates—a logical update may actually be a physical add to the current dictionary domain
Implement a logical delete a delete only affects the current dictionary domain and lower dictionary domains

H. Domain Selection

The system selection screen incorporates the selection of a dictionary domain. After the [SE] system engineer selects a computer system, the new process requires a choice of a dictionary domain from a list made up of the intersection of the dictionary domains on the system record. Additionally, the domain hierarchy is obtained and stored in the event record for use by the invention.

I. Migration

This aspect performs the migration between dictionary domains. It has the following functions:
Read the process to be moved in the "from" dictionary domain and determine all the data base records connected to the process.
On all instance records, read for the same key (excluding domain) in to "to" dictionary domain. If a match is found and the short and long names are the same in both dictionary domains, the invention replaces the instance in the "to" dictionary domain with the instance in the "from" dictionary domain. If a match is found but the short and long names are not equal, the instance is rejected and not moved. Such a situation occurs when there are two distinct instances with the same short and/or long name. For unmatching data base records, the instance is moved to the new dictionary domain by physically deleting the data base record in the "from" dictionary domain and adding it into the "to" dictionary domain.
On all relate and text data base records, the invention reads for the same key (excluding domain) in the "to" dictionary domain. If a match is found, the data base record in the "to" dictionary domain is physically deleted. For both a match and a nonmatch, the data base record from the "from" dictionary domain is added to the "to" dictionary domain, and the data base record is physically deleted in the "from" dictionary domain.

The xref data base records does not need any direct action since both xref records and backpoint records automatically handle the actions taken on instance records and relate records.

2. Structure of the Encyclopedia Data Base and Description of Interface Used by Workstation Applications to Maintain the Encyclopedia The encyclopedia consists of 5 data bases and 1 access module. The five data bases are:

1) the instance data base, used to retain information about each instance of every entity defined.
2) the relationship data base, used to record the relationship between those entities.
3) the xref data base, used to provide a generalized cross-reference ability.
4) the text data base, used to retain textual information about entities or relationships.
5) the ITL data base, used to retain user augmented procedural code.

All input/output to the encyclopedia will go through the workstation access module. This workstation access module is used to communicate with a data base server.

A. Standard Lead

Each data base record in each data base contains a standard lead, a file key and data. Those parts of the standard lead that are required for any particular entity or relation type is defined in the class data area for that entity. The class data is contained on the 00000000 record for that entity type.

B. The Instance Data Base

This data base contains information about each instance of every entity type defined. The data dictionary contains a complete list of entity types and codes. The key structure of this data base includes one field for instance-type and one for instance-sequence. A set number of definitions is included in the access module to define the instance-type value for each entity type.

C. The 00000000 Record

The 00000000 record of each entity type contains the control information about that entity type. This data is used for key assignment and generic entity processing.

Each element contained in the structure in the datastructure field has a corresponding entry in the options table. The bit settings on the option byte will have one of the following meanings: 1) required, 2) this field is cross referenced, or 3) this field is not enterable by the user.

D. The Relationship Data Base

The relationship data base contains the information contained at the connection level between two entity instances. The structure of the application data follows exactly the rules for data on the instance records. The 'zero' key contains the control information about this connection using the same technique used for instance records. Absence of a 'zero' record implies that a connection between these two entities is not allowed.

The key structure contains one field for each of the following: instance-type, instance-sequence, footprint (optional), connection-type, relate-sequence, tar-instance-type, and tar-instance-sequence. Connection-type should have the one of four values/meanings: parent, child, forward, or backward.

E. The Cross-Reference Data Base

The cross-reference (xref) data base contains a generalized cross-reference facility that is used by the applications to maintain symbolic cross-reference keys. The cross-reference access module is used to access and maintain cross-reference data.

The key structure contains one field for xref-word and one for xref-sequence.

F. The Text Data Base

The text data base is the repository for general text information. It contains the key of either an instance or a relationship, then a sequentially assigned sequence number. Each record contains the next available key field, but it only has significance on the 'zero' text record for an entity.

G. The Access Module

The access module for all files from a workstation has the following communications area outlined below. Required fields for each data base are listed next to the function.

Functions and Required Fields:

The following is a detailed example of the major functions and required fields to perform transactions on the data bases.

```
FUNCTION: READ
  Required Data:
    Inst_DB    INSTANCE_KEY or ((SH_NAME or
               LG NAME) and INST TYPE)
    Relate_DB  RELATE_KEY (Seq_Nbr optional)
    Xref_DB    XREF_WORD (Seq_Nbr optional)
    Text_DB    KEY (Seq_Nbr optional)
  Return Codes:
    IB_RC_OK - record read
    IB_RC_NOT_FND - record not found
    IB_RC_DUP_KEY - duplicate key
    IB_RC_KEY_FMT - key format error
    IB_RC_ERROR - severe error required data:
  The requested record will be returned in the
  IO_AREA
FUNCTION: READ UPDATE
  Required Data:
    Inst_DB    INSTANCE_KEY
    Relate_DB  RELATE_KEY
    Xref_DB    XREF_KEY
    Text_DB    TEXT_KEY
  Return Codes:
    IB_RC_OK - record read
    IB_RC_NOT_FND - record not found
    IB_RC_DUP_KEY - duplicate key
    IB_RC_KEY_FMT - key format error
    IB_R_ERROR - severe error
  The requested record will be returned in the
  IO_AREA
FUNCTION: DELETE
  Required Data:
    Inst_DB    INSTANCE_KEY
    Relate_DB  RELATE_KEY
    Xref_DB    XREF_KEY
    Text_DB    TEXT_KEY
  Return Codes:
    IB_RC_OK - record read
    IB_RC_NOT_FND - record not found
    IB_RC_DUP_KEY - duplicate key
    IB_RC_KEY_FMT - key format error
    IB_RC_NO_RUPDT - no prior read for update
```

-continued

```
IB_RC_ERROR - severe error
The record will be deleted, but retained in the
IO_AREA. All cross-reference data will be deleted
automatically also.
FUNCTION: ADD
   Required Data:
      Inst_DB    SH_NAME, LG_NAME and INST_TYPE
      Relate_DB  inst_type
                 inst_seq
                 ib_fp_desired
                 tar_inst_type
                 tar_inst_seq
      Xref_DB    XREF_WORD
                 TARGET_DATA
      Text_DB    KEY
   Return Codes:
      IB_RC_OK - record read
      IB_RC_KEY_FMT - key format error
      IB_RC_ERROR - severe error
The sequence number always is supplied by the data
base server. It is only returned when the record
is successfully added to the encyclopedia.
FUNCTION: UPDATE
   Required Data:
      Inst_DB    INSTANCE_KEY
      Relate_DB  RELATE_KEY
      Xref_DB    XREF_KEY
      Text_DB    TEXT_KEY
   Return Codes:
      IB_RC_OK - record read
      IB_RC_NOT_FND - record not found
      IB_RC_DUP_KEY - duplicate key
      IB_RC_KEY_FMT - key format error
      IB_RC_NO_RUPDT - no prior read for update
      IB_RC_ERROR - severe error
The record will be retained in the io-area.
FUNCTION: RESEQ
   Required Data:
      Relate_DB  inst-type
                 inst-seq
   Return Codes:
      IB_RC_OK - records resequence begun
      IB_RC_ERROR - severe error
```

Steps Required When Adding A New Entity Type:
1) Add the two character identifier to the Type:
2) Add a structure to represent the data portions of the instance record.
3) Build the 'zero' record for this entity type.
4) Build the 'zero' records for connections.

The following chart illustrates the mapping between (a) certain system functions and terminology and (b) the corresponding sections of the microfiche appendix and the specification in which the terminology is clarified.

MAPPING CHART

Creation of Dictionaries

Fiche 1 Frame D01:

Under the heading "ADD THE REQUESTED RECORD . . . ", the routine R100_DD adds a dictionary domain entity to the data base to create a new dictionary. The variable DOMAIN_IDO is used to store the ID of the new dictionary created by this routine.

Assignment of Hierarchy to Dictionaries

Fiche 1 Frame D01;

(a) In the data structure DOMAIN_HIERARCHY, the hierarchical structure of a dictionary is defined.

(b) The data structures DDOMAX_DICT_$DOMAINo$2a, DD_PTR, CDD_PTR, TDD_PTR, LPTR, NPTR, and LAST_LEAF_PTR show how the data structure of a hierarchy is used.

(c) Under the heading "LOOP THROUGH THE DOMAIN HIERARCHY . . . ", the subroutine section starting at "FOR (TDD_PTR = PTR; . . . " the hierarchy assignments can be found.

Dictionary hierarchy is also discussed in the specification in section I.1.F.

Definition/Structure of Encyclopedia

Fiche 6 Frames G05 and G06:

Below "MEMBER = K004", an example of the data structure of the encyclopedia is shown. In this data structure, the name of each data element is followed by the corresponding external length, internal length, and the type of data element.

Fiche 2 Frame C01:

Under the heading "ESB IDS FOR ALL RELATE TYPES", the structure of all relationships in the encyclopedia is shown in the right-most column, e.g., "AD—>AD".

The structure of an encyclopedia is also described in detail in the specification in section I.2.

Definition of Migration

Fiche 1 Frame D01:

As shown under the heading "PERFORM INITIALIZATION", migration is explicitly defined by the program line in which the comment (in the right-most column) "ENTITY MIGRATION" appears. Here it can be seen that migration is the transferring of an entity from one domain to another domain. The concept of migration is also defined in the specification in "Summary of the Invention", paragraph 5 and in section I.1.I.

Types of Modifications Which Are Migrated

Fiche 2 Frame C01:

Under the heading "ENTITY TYPE LONG NAMES", a complete list is given of the various types of entities that can be migrated. These entities include screens, logical processes, etc.

Control/Regulation of Migration

Fiche 1 Frame D01:

Under the heading "READ THE SIGNON RECORD", it can be seen that at sign-on time, a user must select an active domain.

Under the heading "LOOK UP CURRENT DOMAIN . . . ", the domain hierarchy is verified against a domain table for each access attempted.

Additional disclosure of the manner in which migration is controlled appears in the specification in section I.1.I.

It should be understood that the present invention is not limited to the precise structure of the illustrated embodiments, it being intended that the foregoing description of the presently preferred embodiments be regarded as an illustration rather than as a limitation of the present invention. It is the following claims, including all equivalents, which are intended to define the scope of the invention.

I claim:

1. A method in a computer system for managing a plurality of data records stored in a data base on said computer system, which data records are used by a plurality of users and processes operating in said computer system, wherein a migration of certain modified said data records between two areas of said data base is performed, said method comprising the steps of:

creating a plurality of dictionaries, each of which identifies a set of logically related ones of said data records;

assigning said plurality of dictionaries in hierarchical order into at least two logical data bases within said data base, each said logical data base being accessible by said users and processes operating in said computer system; and defining an encyclopedia that contains data that specifies a set of relationships between said plurality of dictionaries and said at least two logical data bases to regulate said migration of modifications to said data records between said plurality of data dictionaries within each of said at least two logical data bases.

2. The method recited in claim 1 wherein said encyclopedia specified relationships allow any said user or said processes to be related to one or more other of said processes.

3. The method recited in claim 2 further comprising the steps of:

assigning each of said users and processes a unique key to identify that user and process;

permuting a key assigned to one of said users or processes to define relationships with an other of said users or processes;

storing said permuted key in said encyclopedia.

4. The method recited in claim 1 wherein said ordered hierarchy of dictionaries comprises an ordering of at least two dictionaries such that each lower level dictionary in said ordered hierarchy inherits the contents of the higher level dictionaries in said ordered hierarchy.

5. The method recited in claim 4 wherein changes made within data records identified by a dictionary or within a dictionary itself affect only that dictionary and its subordinates in said ordered hierarchy.

6. The method recited in claim 1 wherein said step of assigning includes one of said users defining an arbitrary hierarchy of said dictionaries to control changes to the ones of said data records identified by said dictionaries.

* * * * *